(12) United States Patent
Gautam et al.

(10) Patent No.: US 11,040,320 B2
(45) Date of Patent: Jun. 22, 2021

(54) DRYING SYSTEMS

(71) Applicant: SABIC Global Technologies B.V., Bergen op Zoom (NL)

(72) Inventors: Pankaj Singh Gautam, Evansville, IN (US); Thomas Hocker, Pittsfield, MA (US); William E. Hollar, Jr., Mt. Vernon, IN (US); James Alan Mahood, Evansville, IN (US); Richard Peters, Hinsdale, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 360 days.

(21) Appl. No.: 15/558,658

(22) PCT Filed: Mar. 17, 2016

(86) PCT No.: PCT/US2016/022883
§ 371 (c)(1),
(2) Date: Sep. 15, 2017

(87) PCT Pub. No.: WO2016/153922
PCT Pub. Date: Sep. 29, 2016

(65) Prior Publication Data
US 2018/0111104 A1    Apr. 26, 2018

Related U.S. Application Data

(60) Provisional application No. 62/135,974, filed on Mar. 20, 2015.

(51) Int. Cl.
*B01J 2/06* (2006.01)
*B29B 13/06* (2006.01)
*B01J 2/04* (2006.01)
*B33Y 80/00* (2015.01)
*B29K 69/00* (2006.01)

(52) U.S. Cl.
CPC . *B01J 2/06* (2013.01); *B01J 2/04* (2013.01); *B29B 13/06* (2013.01); *B29B 13/065* (2013.01); *B33Y 80/00* (2014.12); *B29K 2069/00* (2013.01)

(58) Field of Classification Search
CPC ...... B01D 1/14; B01D 1/18; B01J 2/04; B01J 2/02; B29B 13/06; B29B 13/065; B05B 7/262; B05B 7/265; B05B 7/1686; B05B 7/0483; B05B 7/0853; B05B 7/0876; B05B 7/04; C08J 2369/00; C08J 3/122; B29K 2069/00; C08G 64/406
See application file for complete search history.

(56) References Cited

U.S. PATENT DOCUMENTS

| | | |
|---|---|---|
| 3,074,923 A | 1/1963 | Cosby et al. |
| 3,508,339 A | 4/1970 | Neblett et al. |
| 4,209,912 A | 7/1980 | Barker |

(Continued)

FOREIGN PATENT DOCUMENTS

| | | |
|---|---|---|
| DE | 102004059069 A1 | 6/2006 |
| EP | 0616002 A1 | 9/1994 |

(Continued)

*Primary Examiner* — Xiao S Zhao
*Assistant Examiner* — Ninh V Le
(74) *Attorney, Agent, or Firm* — Cantor Colburn LLP

(57) ABSTRACT

Provided are improved steam-drying systems, the systems being configured so as to multiple resin streams into steam streams.

17 Claims, 12 Drawing Sheets

(56) References Cited

U.S. PATENT DOCUMENTS

| | | | |
|---|---|---|---|
| 4,212,967 A | 7/1980 | Govoni et al. |
| 4,568,418 A | 2/1986 | Walko et al. |
| 5,253,991 A | 10/1993 | Yokota et al. |
| 5,317,083 A | 5/1994 | Freitag et al. |
| 5,475,084 A | 12/1995 | Okamoto et al. |
| 5,615,831 A | 4/1997 | Molezzi et al. |
| 5,852,157 A | 12/1998 | Zaby et al. |
| 6,362,304 B1 | 3/2002 | Hollar, Jr. et al. |

FOREIGN PATENT DOCUMENTS

| | | | |
|---|---|---|---|
| WO | 2004035187 A2 | 4/2004 | |
| WO | WO2006/060928 A2 | * | 6/2006 |

* cited by examiner

DRYING SYSTEMS

CROSS-REFERENCE TO RELATED APPLICATIONS

This application is the National Stage of International Application No. PCT/US2016/022883, filed Mar. 17, 2016, which claims the benefit of U.S. Provisional Application No. 62/135,974, filed Mar. 20, 2015, the disclosures of which are incorporated herein by reference in their entireties.

TECHNICAL FIELD

The present disclosure relates to the field of polymer drying systems and processes.

BACKGROUND

The present invention relates generally to steam precipitation methods for producing polycarbonate resin powder from polycarbonate solutions in nonaqueous solvent (e.g., methylene chloride). More specifically, the present invention relates to a more energy efficient method of steam precipitation which produces a powder having a relatively lower water content, thereby avoiding the need for a substantial portion of the post dryer capacity that would otherwise be required to produce an acceptably dry polycarbonate powder. Dry powder typically has less than 1% by weight volatiles.

Polycarbonates are a widely used class of thermoplastic materials, which are prized for their superior clarity and physical toughness. One preferred method of producing polycarbonates, which is commonly referred to as the "interfacial method," comprises reacting phosgene and bisphenol-A in a two-phase system having an aqueous and a nonaqueous phase wherein the nonaqueous phase typically comprises methylene chloride as a solvent. Upon reaction, a solution of polycarbonate in methylene chloride is typically formed. Next, the aqueous phase is typically removed and the methylene chloride phase may be washed to help remove residual salts, catalysts and other impurities.

In the final drying step, the polycarbonate in methylene chloride solution must be converted to a dry polycarbonate powder. This step typically accounts for a large fraction of the total production cost because drying the powder is a very energy intensive process, which typically employs hot gas dryers. These dryers require large amounts of electricity and steam to operate and are maintenance intensive. The required electricity and steam are expensive to produce, and their production involves an environmental cost. The drying step is also problematic because the capacity of interfacial polycarbonate synthesis plants is often limited by their capacity to perform this final drying step.

Steam precipitation is a commonly employed industrial method for converting polycarbonate in methylene chloride solution to wet polycarbonate powder. In steam precipitation, the polycarbonate solution is atomized and sprayed into a flowing steam atmosphere. The steam atmosphere is at a sufficient temperature and pressure to cause methylene chloride to evaporate from the small droplets of polycarbonate solution, forming granular particles, which are conventionally recovered in a downstream precipitation piping loop.

Unfortunately, while steam precipitation is relatively efficient at vaporizing the methylene chloride, the steam itself simultaneously partially condenses on the particles, forming a wet powder. The wet powder typically has a water content of from about (or from) 25 to about (or to) 60 percent by weight. Several downstream dryers are necessary to remove the residual water from the wet powder to produce a dry product powder having an acceptable percent water content (wt.), which is typically less than 1 percent.

In common processes, a solution of polycarbonate dissolved in methylene chloride is fed into a jet where it is introduced into a flow of high temperature steam which causes the methylene chloride to vaporize and allows the polycarbonate to solidify. The design of the jet influences the energy efficiency of the process, as well as the particle size of the final polymer powder. Jet designs that increase energy efficiency or improve the particle size distribution of the product make the overall manufacturing process more desirable.

Conventional jet designs establish a baseline for energy efficiency and particle size distribution of the product powder. Increasing the concentration of the polymer solution or preheating the polymer solution before it enters the jet increases overall energy efficiency. Some have described various improvements in steam ratios, resin concentration, and jet design, all designed to improve energy efficiency and resin particle size distribution.

By the present invention, Applicants have discovered an improved steam precipitation method for producing polycarbonate powder having a relatively lower water content than powder produced by conventional steam precipitation. The improved method enables the production of dry powder using less energy (i.e., steam and electricity) and potentially fewer dryers (with less maintenance).

SUMMARY

As described herein, energy efficiency and particle size distribution can be improved by changing the jet design to introduce multiple smaller resin solution streams to each jet. In other words, instead of introducing a resin solution into a jet through a single resin inlet as described in U.S. Pat. No. 4,209,912, a resin feed may be split and introduced into the steam jet through two or more smaller inlets.

One possible but non-limiting explanation for the improve performance is that feeding the resin through multiple inlets improves atomization of the resin stream, which improves contact between the resin solution and steam flows, which in turn increases energy efficiency and particle size distribution.

These types of jet assemblies can be very difficult and costly to assemble using conventional machining techniques. Development in additive manufacturing (sometimes called 3-dimensional printing or 3D or 3-D printing) enable the simplified construction of the disclosed assemblies out of suitable materials of construction such as stainless steel and other metals and/or alloys.

The flexibility provided by additive manufacturing also allows simplified construction of designs that would not be practical or possible with conventional machining techniques, such as elimination of dead spots in the design, smooth transitions around radius changes, and curved flow channels to better balance flow.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 1 depicts exemplary steam channels for the disclosed technology. FIG. 1(a) presents exemplary channel sizes and configurations. As shown in FIG. 1(b), multiple steam channels may converge at a stage 1 manifold 121. Stage 1 manifolds may in turn be received by a stage 2 manifold 131; a stage 2 manifold may receive (e.g., be in fluid communication with) 1, 2, or more stage 1 manifolds. A stage 3 manifold (not labeled) may receive 1, 2, or more stage 2 manifolds. Thus, the disclosed systems may have several stages of channels that converge to manifolds, which manifolds may themselves further converge, and so on.

FIG. 2 depicts exemplary resin channels for the disclosed technology. FIG. 2(a) presents exemplary channel sizes and configurations. As shown in FIG. 2(c), an inlet 211 may split into several branches 221, which branches then split into further branches 231, which further branches feed into the resin outlets 201.

FIG. 3(a) also depicts branch 221, further branch 231, stage 1 manifold 121, and stage 2 manifold 131, as well as outlet 111. As shown in FIG. 3, four resin channels 201 may feed into a single steam channel 101.

DETAILED DESCRIPTION OF ILLUSTRATIVE EMBODIMENTS

Figure 1A:
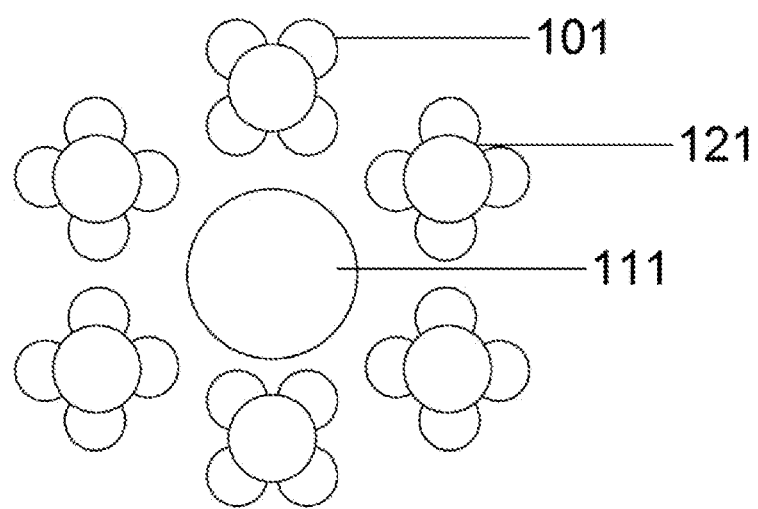
As shown in FIG. 1(a), a device may feature multiple steam channels 101 (e.g., 24 channels) that may connect to stage 1 manifolds 121, which in turn converge to an outlet 111. In one illustrative embodiment, the total cross-sectional area of the 24 channels 101 is about the same (or is the same) as the cross-sectional area of the outlet 111. This is not, however, a requirement, as the outlet may have a cross-sectional area that is greater than or even less than the total cross-sectional area of the channels that feed into the outlet.

The present invention can be understood more readily by reference to the following detailed description taken in connection with the accompanying FIGs. and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. Further, reference to values stated in ranges includes each and every value within that range. Any documents cited herein are incorporated herein by reference in their entireties for any and all purposes.

It is also to be understood that the terminology used herein is for the purpose of describing particular aspects only and is not intended to be limiting. As used in the specification and in the claims, the term "comprising" may include the embodiments "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a virgin polycarbonate" includes mixtures of two or more virgin polycarbonates. Furthermore, for example, reference to a filler includes mixtures of fillers.

Ranges can be expressed herein as from one particular value, and/or to another particular value. When such a range is expressed, another aspect includes from the one particular value and/or to the other particular value. For example, a range of "1 to 10" includes all intermediate values, e.g., 3, 5.56, and 7.3. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated +/−10% a variation unless otherwise indicated or inferred. For example, "about 10" encompasses the range from 9 to 11, including 10. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a recycled polycarbonate blend refers to an amount that is sufficient to achieve the desired improvement in the property modulated by the formulation component, e.g. splaying, under applicable test conditions and without adversely affecting other specified properties. The specific level in terms of wt % in a composition required as an effective amount will depend upon a variety of factors including the amount and type of recycled polycarbonate blend, amount and type of virgin polycarbonate polymer compositions, amount and type of impact modifier compositions, including virgin and recycled impact modifiers, and end use of the article made using the composition.

Disclosed are the components useful in preparing the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutations of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary.

For example, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers known for optical clarity and enhanced impact strength, high heat resistance, and relative ductility at room temperature or below. Polycarbonate may refer to an oligomer or polymer comprising residues of one or more dihydroxy compounds, e.g. dihydroxy aromatic compounds, joined by carbonate linkages; it also encompasses homopolycarbonates, copolycarbonates, and (co)polyester carbonates.

Three pilot plant jet assemblies were used to demonstrate the advantages of this disclosure. The base or control case was a 'conventional one-hole' jet assembly manufactured using conventional machining techniques. This jet assembly contained two steam jets. Resin solution was introduced into the steam flow through a single inlet hole in each steam jet.

The first example of a design covered under this disclosure was a jet assembly labeled '3D one-hole'. This jet was 3D printed using additive manufacturing techniques, but still maintains the same basic structural features as the 'conventional one-hole' jet design. There are two steam jets in the assembly, and the resin solution is introduced into the steam flow through a single inlet hole in each steam jet.

The second example of a design covered under this disclosure was a jet assembly labeled '3D four-hole'. This jet was 3D printed using additive manufacturing techniques and still maintains the same basic design features, but leverages the power of additive manufacturing to deliver a higher level of performance. There are two steam jets in this assembly, but in this case the resin solution is introduced into the steam flow via four smaller inlet holes on each jet.

It is important to note that while relatively simple two steam jet assemblies were used for demonstration purposes, the advantage of additive manufacturing becomes much greater in more complex jet assemblies.

The data in illustrative (but non-limiting) Table 1 show the benefit to introducing the resin solution into the steam jet via multiple smaller channels instead of a single larger channel. Overall resin flows and steam flows are equivalent across all three conditions. The design with four resin holes per steam jet delivered resin with significantly higher bulk density than designs with a single resin hole per steam jet. As is known in the field, higher bulk density resin is a desirable characteristic for polycarbonate production.

TABLE 1

| Run No. | Choke D (in) | Steam D/Jet type | Injector | Resin Feed (gpm) | Desired % Solids | Actual % Solids | Steam Flow (pph) | S/R | Bulk Density (lb/ft³) |
|---|---|---|---|---|---|---|---|---|---|
| 23 | 0.67 | 4 hole-3D | | 4 | 20 | 20 | 660 | 1.25 | 13.80 |
| 24 | 0.67 | 1 hole-3D | | 4 | 20 | 20 | 660 | 1.25 | 12.81 |
| 25 | 0.67 | 1-hole base, 0.302 steam D | A (single) | 4 | 20 | 20 | 660 | 1.25 | 12.04 |

The data in illustrative (but non-limiting) Table 2 show the equivalence of the 'conventional one-hole' jet assembly and the '3D one hole' jet assembly. These data shows that the improved performance above is the result of improved jet design and not simply of conventional machining vs additive manufacturing. In Table 2, S/R is the steam-to-resin ratio.

TABLE 2

| Run | A: Choke D in mm (in) | B: S/R | C: Jet type | Bulk density in kg/m³ (lb/ft³) | Tap density in kg/m³ (lb/ft³) | d10 in um | d50 in um | d90 in um | Coarse psd > Mesh 7 (2750 um) |
|---|---|---|---|---|---|---|---|---|---|
| 1 | 19.05 (0.75) | 3.03 | 1 hole-3D | 195.26 (12.1898) | 230.19 (14.37) | 385.44 | 942.39 | 1802.9 | 1.02 |
| 2 | 19.05 (0.75) | 2.16 | 1 hole-3D | 212.56 (13.2729) | 242.20 (15.12) | 341.88 | 807.66 | 1520.12 | 0.68 |

TABLE 2-continued

| Run | A: Choke D in mm (in) | B: S/R | C: Jet type | Bulk density in kg/m³ (lb/ft³) | Tap density in kg/m³ (lb/ft³) | d10 in um | d50 in um | d90 in um | Coarse psd > Mesh 7 (2750 um) |
|---|---|---|---|---|---|---|---|---|---|
| 3 | 19.05 (0.75) | 1.3 | 1 hole-3D | 239.48 (14.95) | 247.97 (15.48) | 658.89 | 2159.39 | 5960.33 | 41.8 |
| 4 | 19.05 (0.75) | 1.76 | 1 hole-3D | 202.95 (12.67) | 240.43 (15.01) | 417.6 | 962.24 | 1994.1 | 5 |
| 5 | 12.19 (0.48) | 1.49 | 1 hole-3D | 209.84 (13.10) | 239.95 (14.98) | 345.32 | 1059.98 | 3701.19 | 15.21 |
| 15 | 12.19 (0.48) | 1.52 | 1 hole base | 212.56 (13.27) | 241.39 (15.07) | 365.32 | 1043.1 | 5424.37 | 23.82 |
| 16 | 19.05 (0.75) | 1 | 1 hole base | 214.81 (13.41) | 249.08 (15.55) | 578.56 | 1962.63 | 6250.39 | 39.2 |
| 17 | 12.19 (0.48) | 1.1 | 1 hole base | 220.89 (13.79) | 238.67 (14.90) | 603.44 | 2074.62 | 6180 | 41.69 |
| 18 | 12.19 (0.48) | 1.1 | 1 hole base | 220.73 (13.78) | 236.75 (14.78) | 521.15 | 1731.34 | 5948.17 | 38.22 |
| 19 | 19.05 (0.75) | 1.89 | 1 hole base | 190.46 (11.89) | 227.78 (14.22) | 329.68 | 853.25 | 5010.57 | 18.7 |
| 21 | 19.05 (0.75) | 1.89 | 1 hole base | 207.76 (12.97) | 236.11 (14.74) | 379.79 | 926.33 | 1846.17 | 1.96 |
| 33 | 19.05 (0.75) | 2.92 | 1 hole-3D | 179.25 (11.19) | 214.96 (13.42) | 343.77 | 783.74 | 1713.31 | 5.04 |
| 34 | 19.05 (0.75) | 2.36 | 1 hole-3D | 186.78 (11.66) | 241.24 (15.06) | 490.25 | 1076.51 | 2122.52 | 4.43 |
| 37 | 19.05 (0.75) | 3.28 | 1 hole-3D | 195.91 (12.23) | 243.48 (15.20) | 405.28 | 912.57 | 1752.34 | 1.68 |
| 38 | 19.05 (0.75) | 3.28 | 1 hole-3D | 184.53 (11.52) | 223.94 (13.98) | 425.1 | 936.64 | 1809.58 | 2.36 |

As described elsewhere herein, 3D-printed techniques enable users to form geometries that are difficult—if not impossible—to obtain with traditional manufacturing techniques. Thus, one may form one of the disclosed systems (at least in part) with 3D printing. A user may form one or more components of the system and then assemble those components as desired.

Systems

In some embodiments, the disclosed systems include two or more jets. A user may employ two or more configurations (e.g., different steam jet and different resin feed arrangements) in a single system. In this way, a user ay use different jets and different resin feed arrangements for different polymers or even for different grades of polymer.

Figure 1B:
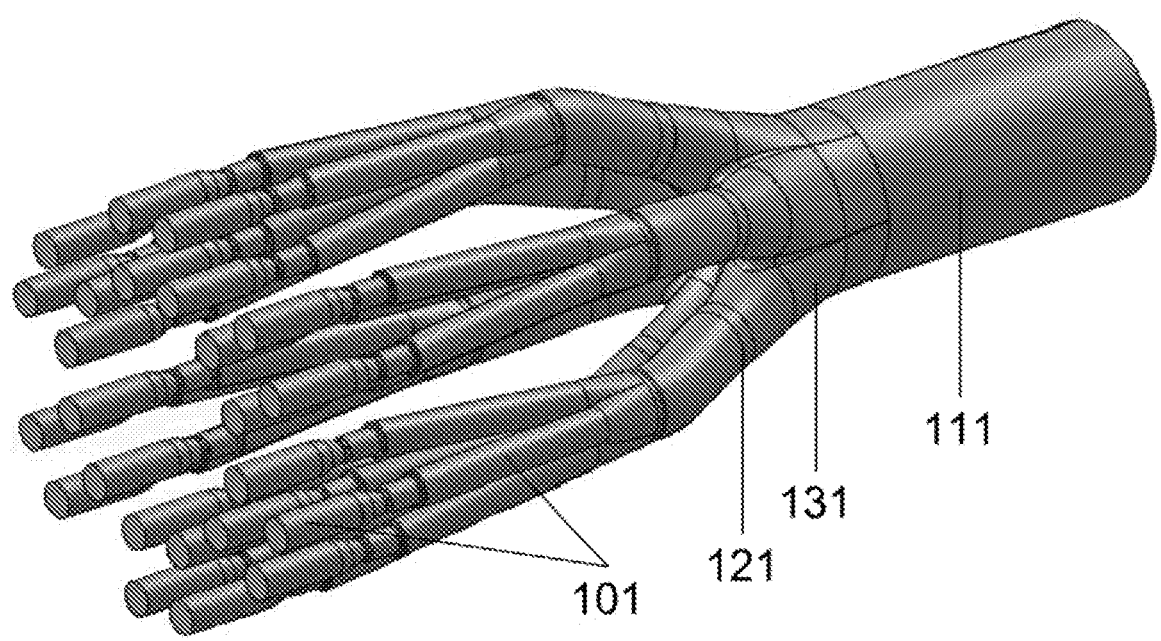
FIG. 1(b) presents an exemplary 3-D view of an arrangement of 24 channels.
Figure 1C:
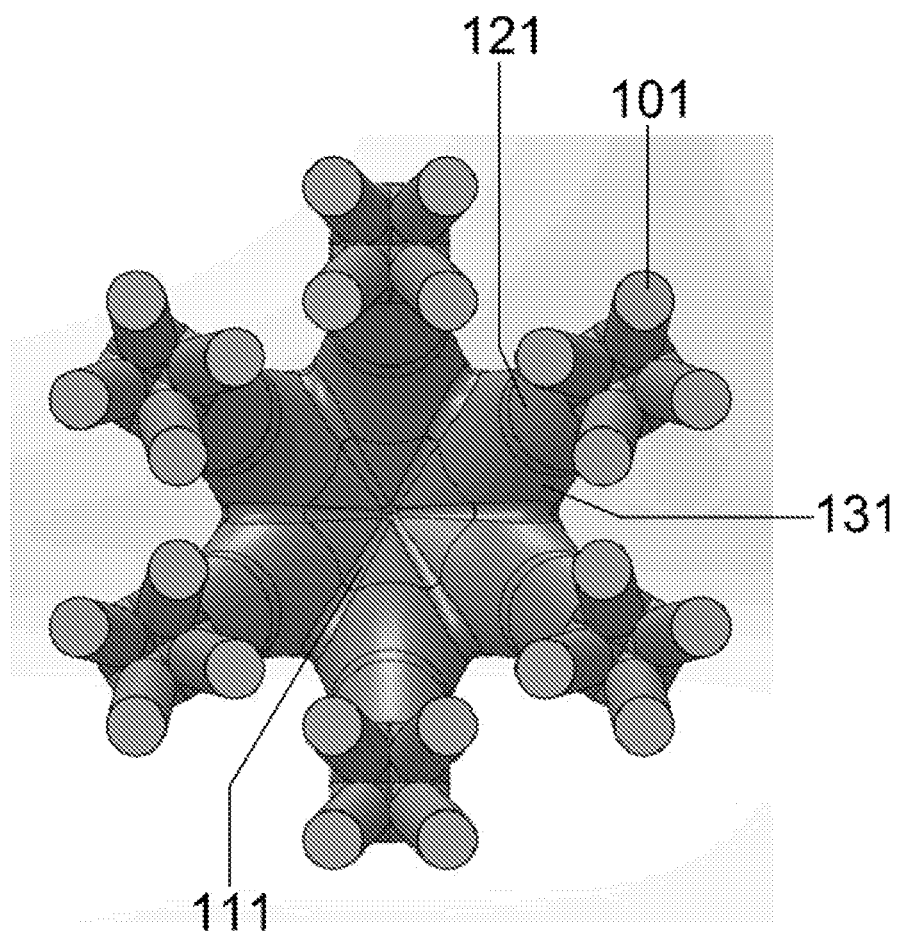
FIG. 1(c) presents an end-on view of the 24 channels 101, the stage 1 manifold 121, stage 2 manifold 131, and outlet 111 described in FIG. 1(a) and shown in FIG. 1(b).
Figure 2A:
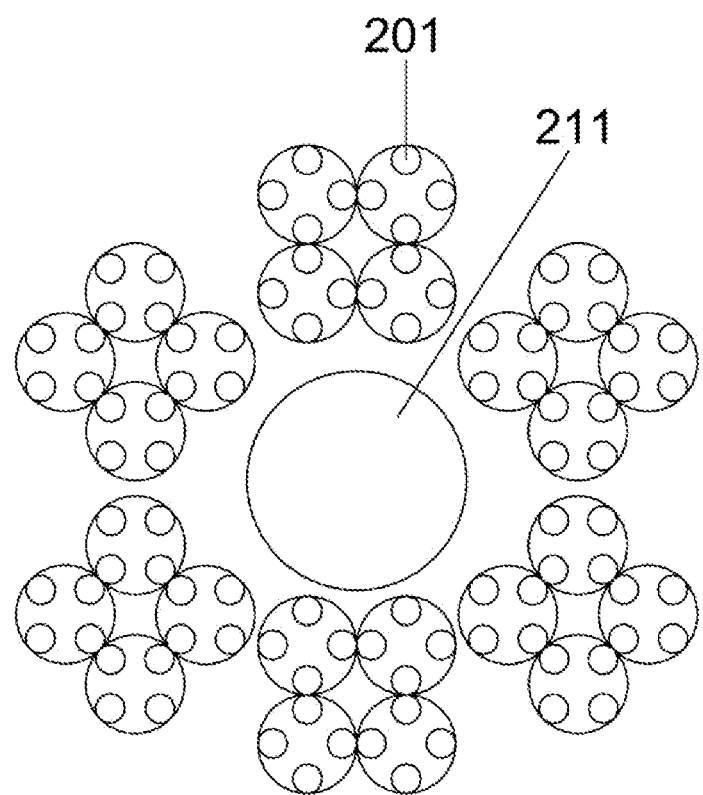
As shown in FIG. 2(a), a device may feature multiple resin channels 201 (e.g., 96 channels) that ultimately diverge from an inlet 211. In this illustrative embodiment, the total cross-sectional area of the 96 outlet channels is about the same (or is the same) as the cross-sectional area of the inlet. This is not, however, a requirement, as the outlet may have a cross-sectional area that is greater than or even less than the total cross-sectional area of the channels fed by the inlet.
Figure 2B:
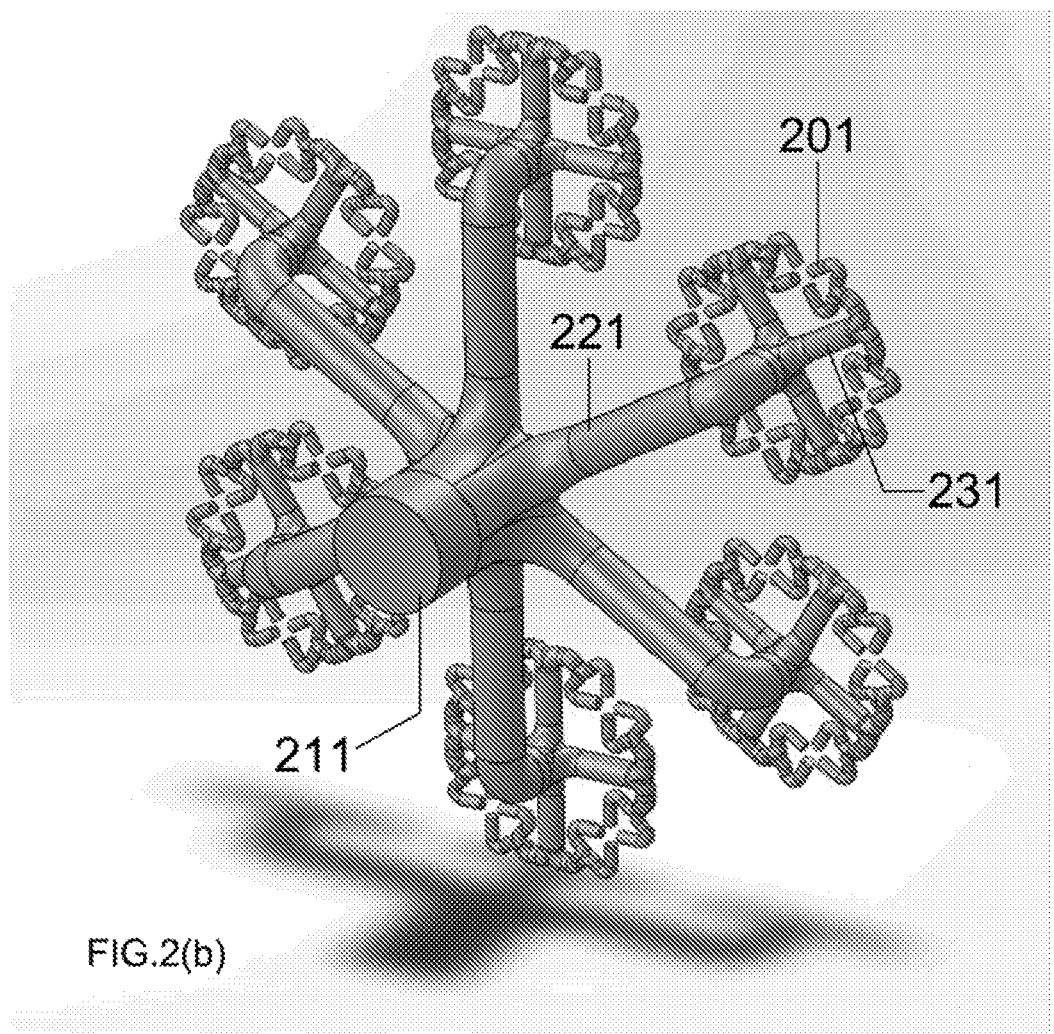
FIG. 2(b) presents an exemplary 3-D view of an arrangement of 96 resin channels 201 along with branch 221, inlet 211, and further branch 231.
Figure 2C:
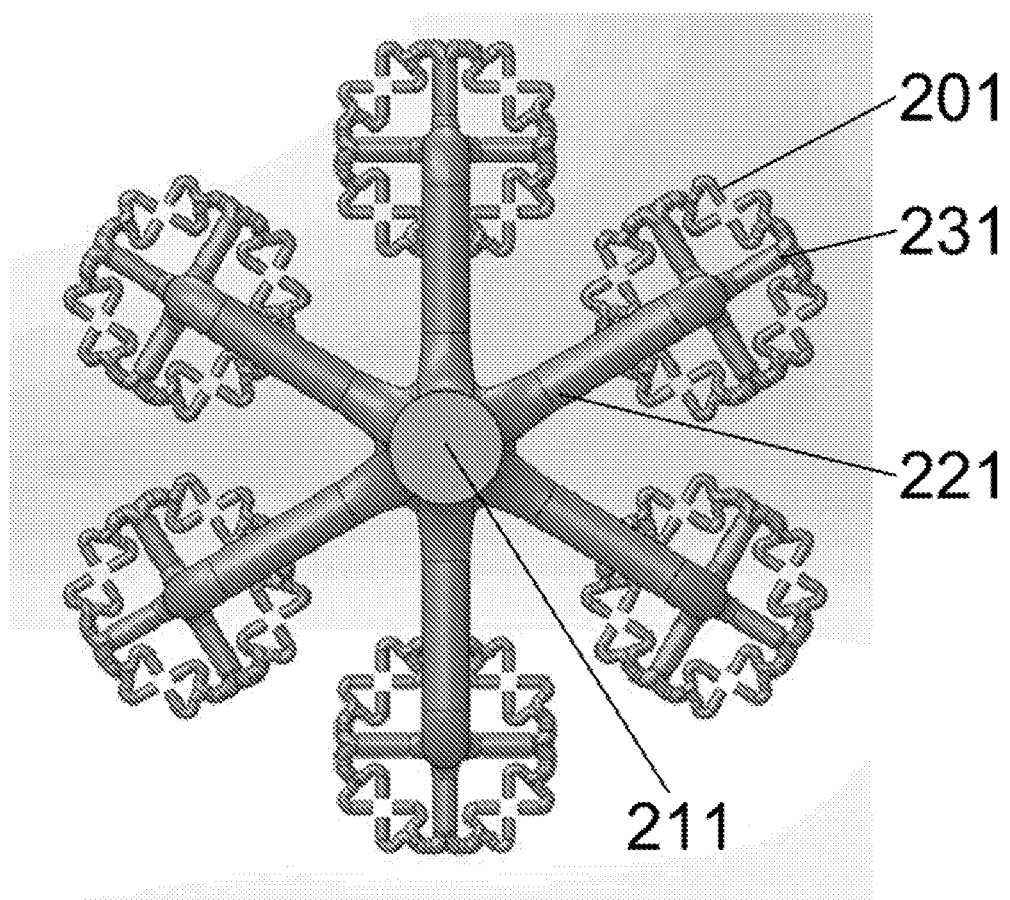
FIG. 2(c) presents an alternative view of the 96 channels described in FIG. 2(a) and shown in FIG. 2(b), again showing resin channels 201, branch 221, inlet 211, and further branches 231.
Figure 3A:
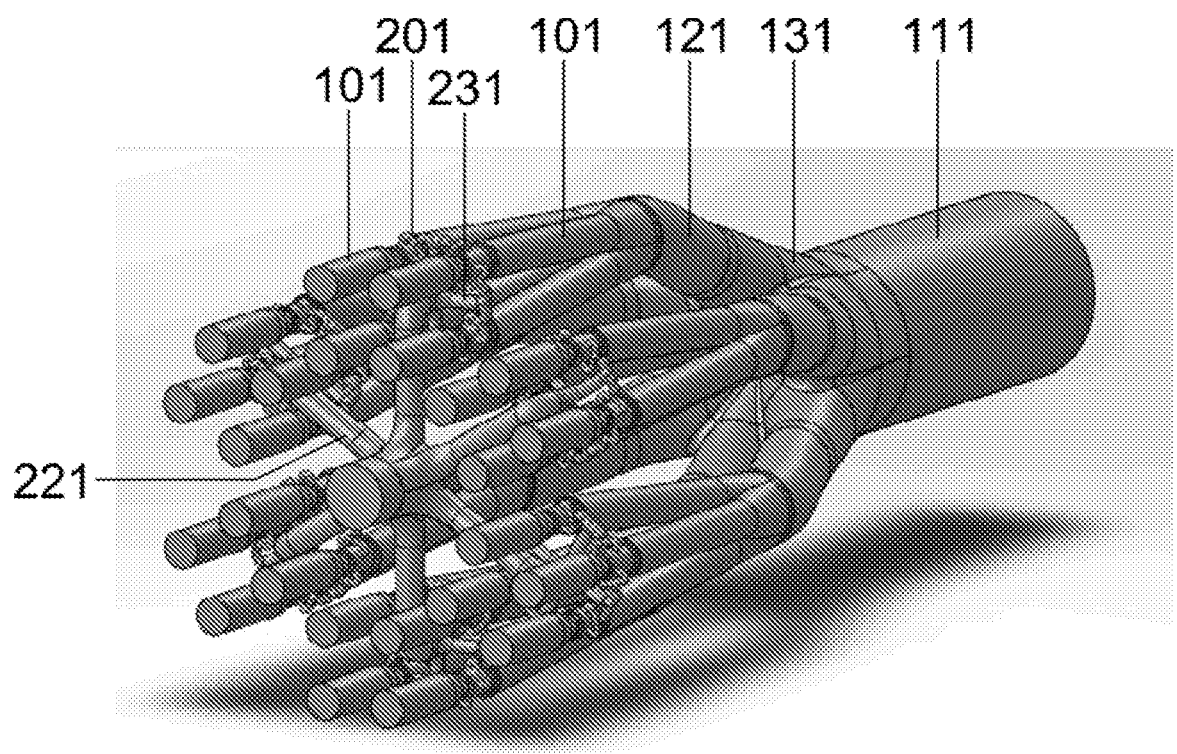
FIG. 3(a) depicts the steam channels 101 of FIG. 1 engaged with the resin channels 201 of FIG. 2.
Figure 3B:
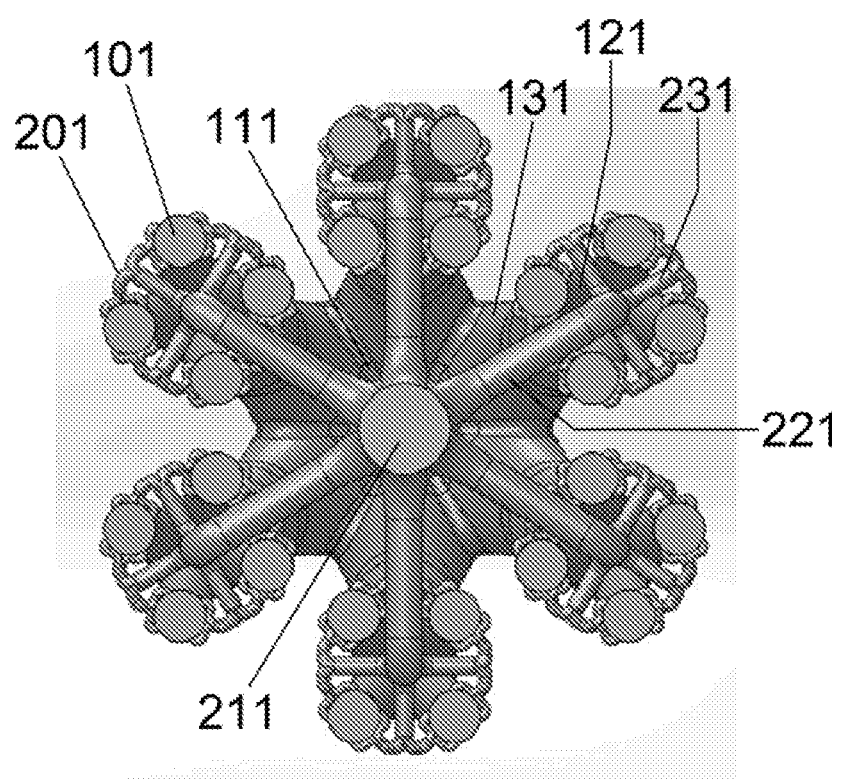
FIG. 3(b) provides an end-on view of the system of FIG. 3(a), showing four resin channels 201 feeding into a single steam channel 101; also illustrated are further branch 231, branch 221, inlet 211, stage 1 manifold 121, stage 2 manifold 131, and outlet 111.
Figure 3C:
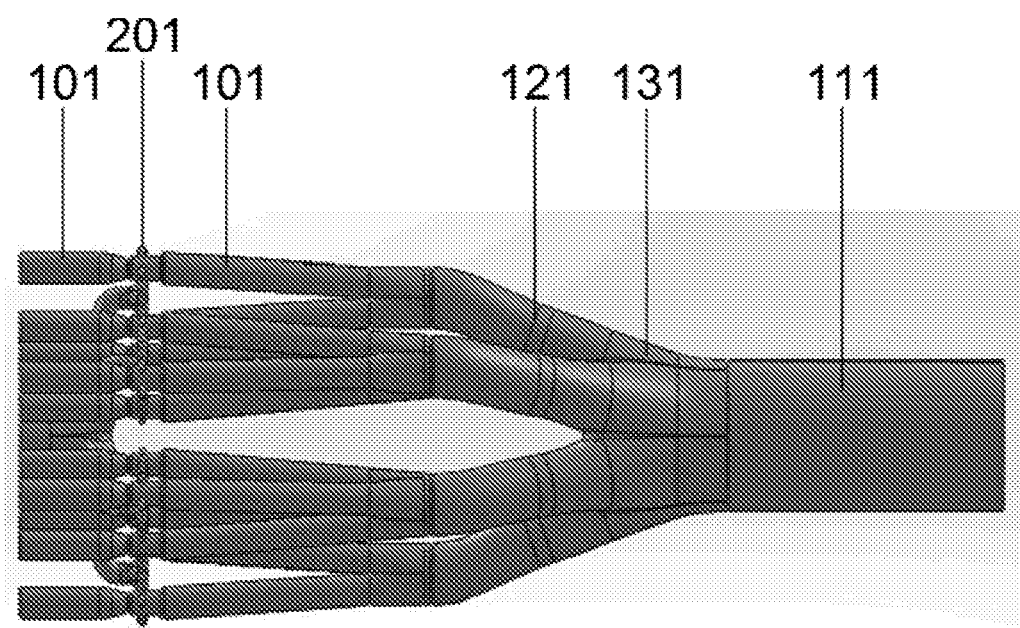
FIG. 3(c) provides an alternative, side-on view of the system of FIG. 3(b), again showing steam channels 101 engaged with resin channels 201; the various branches and manifolds from the preceding figures are also shown.
Figure 3D:
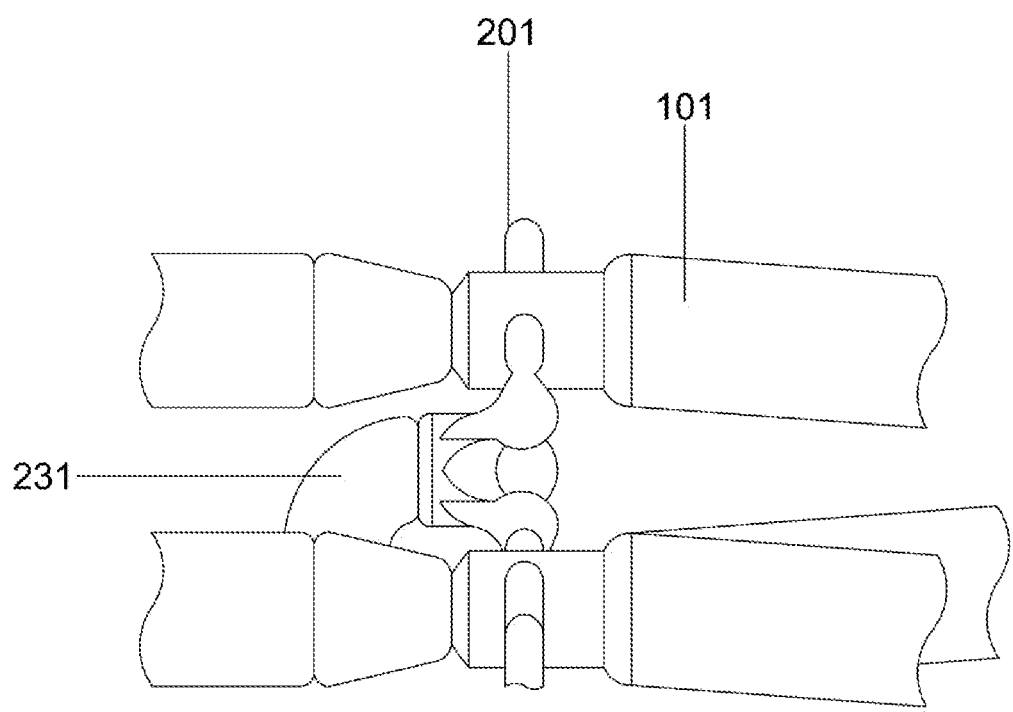
FIG. 3(d) provides a close-up view of an exemplary junction between resin channels 201 and a steam channel 101 that features a constriction and an expansion at the location of resin introduction; also shown is further branch 231.
Figure 3E:
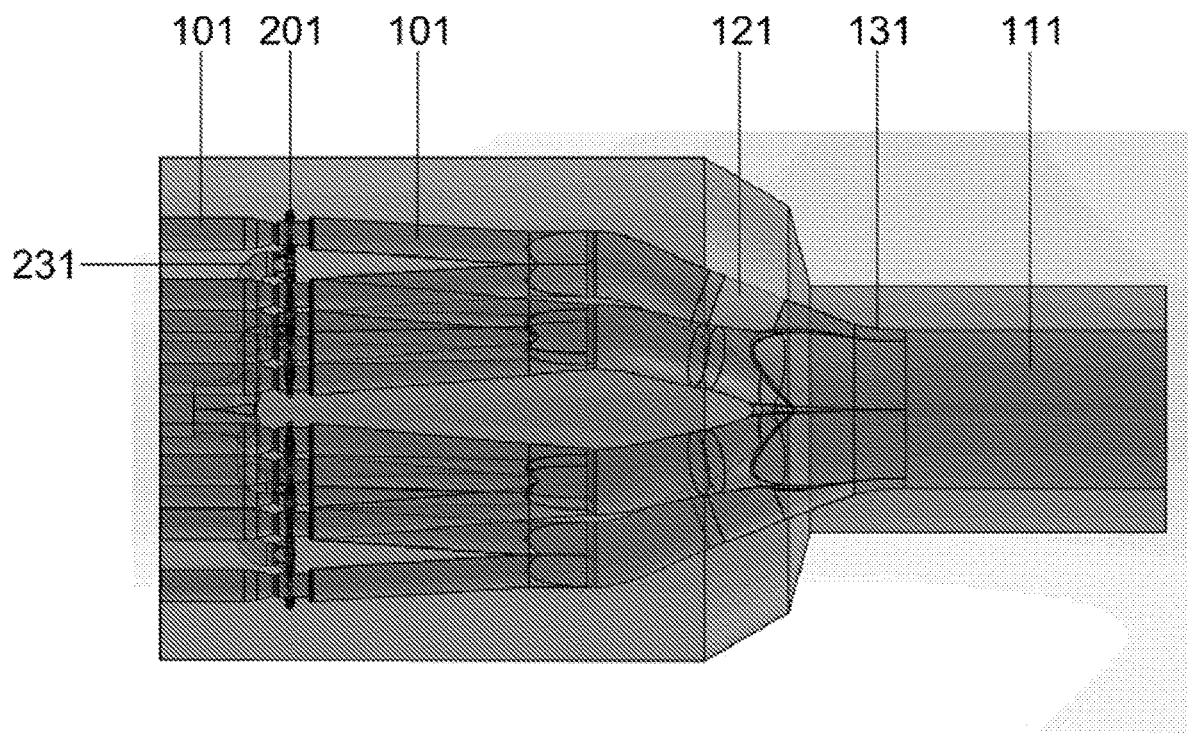
FIG. 3(e) provides a 3-D view of the system of FIG. 3(a), in which view the steam channels 101 and resin channels 201 are present within a solid unit, e.g., a single or multi-piece assembly within which the channels are formed.
Figure 3F:
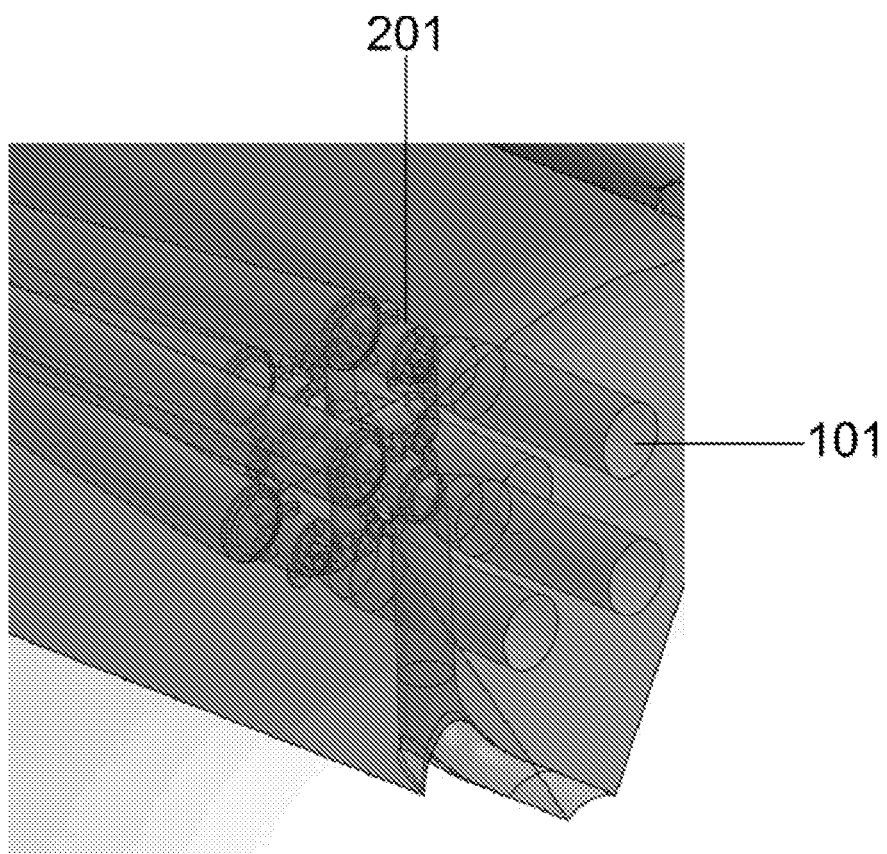
FIG. 3(f) provides an alternative view of the system of FIG. 3(e), again showing resin channels 201 and steam channels 101 engaged with one another. It should be understood that channels may all be formed in a single unit (e.g., via 3-D printing or other methods). In some embodiments, a set of steam channels may be formed separate from the set of resin channels, and then the two sets of channels are assembled together.

An exemplary arrangements is shown in FIGS. 1-3. As shown in FIG. 1, the steam channels of an exemplary device may be arranged such that there are 24 steam channels (FIG. 1a). It should be understood that the 24 channel design is exemplary only and is not limiting or required, as other numbers of channels may be used. These 24 steam channels converge into a single large outlet (FIG. 1a, FIG. 1b). The flow length of each channel is the same.

In this illustrative embodiment, each steam channel addresses four resin channels (FIGS. 1a, 2a, and 3), i.e., 96 resin channels. Each channel has the same length; in this way, the pressure is equalized throughout the system. Same-length channels are not, however, required, as there is no requirement that pressure be equalized within the system.

An outlet may include some measure of choke. As the area decreases, the flow will choke and a standing shock wave will be formed in the zone. A choke, however, allows the user to reduce the amount of steam used while also maintaining good performance.

After the dried polymer is collected, the polymer then may enter a supertube (i.e., a steam-jacketed or otherwise heated pipe), which supertube conveys the powder and steam to a cyclone for further processing. The steam and methylene phase may be condensed and then separated. Without being bound to any particular theory, by this point in the process, the polymer particles have hardened, and phase separation allows a used to process the particles.

The disclosed systems and methods offer a number of advantages. First, the disclosed systems and methods allow a user to use less energy to dry polymer powder—because the polymer particles that exit the steam stage of the system are comparatively dry, the user may use less energy at the downstream stages (e.g., using what may be termed a supertube) to further dry and further process the particles. The disclosed technology also affords a better yield of polymer particles from resin, as well as an increased control over particle size distribution. The preferred particle size distribution is one that is neither too coarse nor too fine. Coarse fractions less than 1.5 weight % are preferred (though not required); higher amounts lead to difficulties in full removal of water and other volatile species. Fine fractions can be less than 5%, with less than 4% preferred, since higher amounts can make the powder difficult to handle and can reduce the bulk density.

In addition, the weight % of material that is greater than 20 mesh gives an idea of the average particle size in the polycarbonate. For example, 50 weight % greater than 20 mesh would mean that the average particle diameter would be in the range of 0.840-1.410 mm. A preferred range for the wt % greater than >20 mesh is 40 to 70%. Less than 40% means that the powder contains a large amount of fines. Greater than 70% above 20 mesh means that the powder has a large fraction of large diameter particles that, in some (but not all instances) can adversely affect the removal of solvent and water from the particles. The disclosed technology may be configured to give rise to a product wherein from about (or from) 40 to about (or from) 70% of the product is greater than 20 mesh.

In a similar vein, the disclosed technology affords drier polymer particles, which drier particles require less energy to ship and otherwise process. Drier powder is easier to densify, which saves space—and energy—with shipping.

The following aspects are illustrative only and do not limit the scope of the present disclosure or the appended claims.

Aspect 1. A polymer precipitation system, comprising (or even consisting of or consisting essentially of): a first plurality of resin channels configured for fluid communication with a resin supply; a first steam channel in in fluid communication with the first plurality of resin channels, and the first plurality of resin channels being configured to deliver resin to the interior of the first steam channel; a second plurality of resin channels configured for fluid communication with the resin supply; a second steam channel in fluid communication with the second plurality of resin channels, and the second plurality of resin channels being configured to deliver resin to the interior of the second steam channel; and the first and second steam channels converging at a first stage 1 manifold.

A steam channel may have an aspect ratio (length:diameter) in the range of from 1 to about (or to) 10,000, from about (or from) 5 to about (or to) 1000, or even from about (or from) 10 to about (or to) 100. A resin channel may have an aspect ratio in the range of from 1 to about (or to) 10,000, from about (or from) 5 to about (or to) 1000, or even from about (or from) 10 to about (or to) 100. The Reynolds number of the flow after the steam and resin solution are contacted (i.e., the Reynolds number of the flow in the steam channel downstream from resin introduction) is suitably at least about (or is) 500, at least about (or is) 1000, or even at least about (or is) 1500 or greater. Reynolds numbers in the range of from about (or from) 1500 to about (or to) 7500 (e.g., 2500) are considered suitable.

A channel (resin or steam) may include a converging portion, a straight portion, a diverging portion, or any combination thereof. Channels may be parallel to one another, but may also converge or diverge. It should be understood that a steam source may provide steam to a first channel, which channel then splits into multiple steam channels at a plenum. Likewise, a source of resin solution may provide resin to a first channel that then splits into multiple channels. A single resin source may supply one, two, or more resin channels.

A steam channel may have one or more slits (or slots) that extend in a circumferential manner about the circumference of the channel. For example, a channel may have four slits, equally spaced around the circumference of the channel, and each slit spanning 25°. A steam channel may also have a resin channel disposed within the steam channel so as to deliver resin into the interior of the steam channel. Such a resin channel may be disposed coaxial with the steam channel.

It should be understood that any channel is suitably circular in cross-section, but may also be polygonal. It should also be understood that a steam channel may have resin introduced at one or more locations along the axial direction of the channel. It should also be understood that resin channels may be configured so as to introduce resin streams that are opposite one another or that contact one another so as to improve atomization of the resin. For example, two resin channels may be oriented opposite one another so that the channels' streams are exerted against one another, improving resin atomization.

In an alternative embodiment, a steam channel has an annular slit or other opening formed therein. Resin solution may then be introduced to the steam channel via that annular slit. The annular slit may go around the entire circumference of the steam channel. Alternatively, the annular slit may go around only a portion of the steam channel's circumference.

The resin solution may have from about 1 to about 50 wt % polycarbonate in the solution, e.g., from 3 wt % to 30 wt %. As described elsewhere herein, the polymer may comprise polycarbonate, and the solvent may comprise methylene chloride.

Aspect 2. The system of aspect 1, wherein the first stage 1 manifold has a cross-sectional area within about (or within) 50%, within about or (within) 30%, within about (or within) 10%, or even within about (or within) 5% of the total cross-sectional area of the steam channels in fluid communication with the first stage 1 manifold.

In some embodiments, a user may desire an amount of back pressure present in the system, e.g., back pressure on a steam channel, back pressure on a resin channel, or both. In order to effect this, an outlet (e.g., a channel or a manifold/plenum) suitably has a smaller cross-sectional area than the total cross-section area of the channels that feed into that outlet. For example, in a configuration where six channels feed into a single outlet, the outlet might have a cross-sectional area of 10 cm$^2$, and each of the six feed channels has a cross-sectional area of 3 cm$^2$. In this way, a system may maintain a more or less constant pressure, and individual channels each experience the same pressure.

Aspect 3. The system of aspects 1 or 2, wherein at least one steam channel, at least one resin channel, or both, is a venturi channel.

An exemplary channel is shown in FIGS. 3(a)-3(f). As shown in that FIG., a steam channel has a contraction followed by a sudden expansion, and it is at this expansion that the resin channel introduces resin solution into the steam channel. This arrangement effects a drop in pressure and also turbulence at the site of resin solution injection, which turbulence improves mixing and system performance.

Aspect 4. The system of any of aspects 1-3, wherein at least one resin channel is configured to deliver resin at the throat of the at least one steam channel.

Aspect 5. The system of any of aspects 1-4, wherein at least one of the first and second pluralities of resin channels comprises (or even consists of or consists essentially of) from 2 to about (or to) 50 channels.

Aspect 6. The system of any of aspects 1-5, wherein at least one of the first and second pluralities of resin channels comprises (or even consists of or consists essentially of) from 4 to about (or to) 20 channels.

Aspect 7. The system of any of aspects 1-6, wherein the direction of flow within a steam channel and the direction of flow within a resin channel received by that steam channel define an angle therebetween, the angle being from 0 degrees to 180 degrees, e.g., from 5 to 175 degrees. In some embodiments, a resin channel is configured to deliver resin fluid at a right angle to the direction of steam flow within a steam channel. In some embodiments, a resin channel is configured to deliver resin fluid at an acute (e.g., 15 degrees) angle to the direction of steam flow within a steam channel. In other embodiments, a resin channel is configured to deliver resin fluid at an obtuse (e.g., 105 degrees) angle to the direction of steam flow within a steam channel Aspect 8. The system of aspect 7, wherein the angle is between about (or is) 20 and about 110 degrees or and 110 degrees.

Aspect 9. The system of any of aspects 1-8, wherein at least two channels of the first plurality of resin channels are oriented opposite one another where the at least two channels are in fluid communication with the first steam channel.

Aspect 10. The system of any of aspects 1-9, wherein the channels of the first plurality of resin channels are spaced regularly about the first steam channel.

Aspect 11. The system of any of aspects 1-9, wherein the channels of the first plurality of resin channels are spaced irregularly about the first steam channel.

Aspect 12. The system of aspect 1, wherein at least one of the resin channels is a venturi channel.

Aspect 13. The system of any of aspects 1-12, further comprising (or even consisting of or consisting essentially of) a third steam channel and a fourth steam channel.

Aspect 14. The system of aspect 13, wherein the third and fourth steam channels are in fluid communication, respectively, with third and fourth pluralities of resin channels.

Aspect 15. The system of aspects 13 or 14, wherein the first stage 1 manifold is configured to receive one or both of the third and fourth steam channels.

Aspect 16. The system of aspects 13 or 14, further comprising (or even consisting of or consisting essentially of) a second stage 1 manifold, the second stage 1 manifold being configured to receive one or both of the third and fourth steam channels.

Aspect 17. The system of aspect 16, further comprising (or even consisting of or consisting essentially of) a first stage 2 manifold configured to receive one or both of the first stage 1 manifold and the second stage 1 manifold.

Aspect 18. The system of aspect 1, the system comprising (or even consisting of or consisting essentially of) from 2 to about (or to) 30 stage 1 manifolds.

Aspect 19. The system of aspect 18, wherein at least 2 of the stage 1 manifolds receive from 2 to about 50 (or to 50) resin channels.

Aspect 20. The system of aspect 19, wherein at least 2 of the stage 1 manifolds receive from 4 to about 20 (or to 20) resin channels.

Aspect 21. The system of aspect 18, further comprising (or even consisting of or consisting essentially of) from 2 to about 30 (or 30) stage 2 manifolds.

Aspect 22. The system of aspect 21, wherein at least 2 stage 2 manifolds receive 2 or more stage 1 manifolds.

Aspect 23. The system of aspect 21, further comprising (or even consisting of or consisting essentially of) at least one stage 3 manifold.

Aspect 24. The system of aspect 23, wherein the at least one stage 3 manifold receives at least one stage 2 manifold.

Aspect 25. The system of aspect 17, wherein the cross-sectional area of the stage 2 manifold is less than the total cross-sectional area of the stage 1 manifolds that the stage 2 manifold receives.

Aspect 26. The system of aspect 23, wherein the cross-sectional area of the stage 3 manifold is less than the total cross-sectional area of the stage 2 manifolds that the stage 3 manifold receives.

Aspect 27. The system of any of aspects 1-26, wherein at least two of (a) resin channel, (b) a steam channel, and (c) a stage 1, a stage 2, and a stage 3 manifold are formed in a single workpiece (e.g., a monolithic unit). A workpiece may comprise (or even consist of or consist essentially of) metal, plastic, or even be a composite material. Stainless steel is considered a particularly suitable material. It should be understood that a drying system may be formed from one, two, or more workpieces.

Aspect 28. The system of aspect 26, wherein the workpiece is at least partially fabricated by additive manufacturing. Exemplary additive manufacturing processes include 3-D printing, molding, and the like.

3-D printing is considered a particularly suitable formation process, as 3-D printing allows one to fabricate the disclosed workpieces to virtually any size, shape, and composition. When using 3-D printing, a user may identify a particularly suitable workpiece material and then use 3-D printing to fabricate custom-shaped workpieces from that material. Alternatively, a user may identify a suitable workpiece shape and then use 3-D printing to fabricate workpieces of that shape using various materials.

In one exemplary fabrication of the disclosed workpieces via 3-D printing, a user may prepare a data file that describes the shape of the desired workpiece, which data file is then used to direct the additive manufacture of the workpiece by a 3-D printer. A data file may be generated by scanning an existing object, e.g., an existing workpiece (or a model thereof) or even a unit to which the workpiece will be mated. A data file may also be generated based on the specific dimensions that a user may desire for the resultant workpiece. A data file may also be generated based on some combination of the foregoing. A data file may be used to direct the fabrication of the workpiece.

A user may fabricate a workpiece as a single article or as multiple parts that are then assembled together or otherwise positioned in the appropriate locations. A data file may include information regarding workpiece dimensions as well as information regarding the material or materials from which the workpiece is made; as described below, a workpiece may be made from one material or from multiple materials.

A workpiece may be 3-D printed in a variety of methods. As one example, the workpiece may be formed in an additive fashion by extruding thermoplastic material (e.g., metal, plastics, and the like), which material then hardens. Typically, a thermoplastic filament wound on a coil is unreeled to supply material to an extrusion nozzle head, and the movement of the head is dictated by the data file that describes the workpiece. Further background information may be found in, e.g., U.S. Pat. No. 8,827,684 (incorporated herein by reference for any and all purposes). Workpieces may also be formed by dispensing granular materials (e.g., metal powder) and then binding (e.g., via heat application, chemical application, or both) the dispensed granules. A workpiece may also be formed by 3-D photopolymerization, in which technique liquid polymer is dispensed (e.g., via a dispensing head) and then exposed to controlled lighting so as to harden the exposed liquid polymer. A support plate (and/or the dispensing head) then moves in small increments and the liquid polymer is again exposed to light, and the process repeats until the desired part has been formed. Other suitable processes include selective laser melting processes. Such processes may comprise additive manufacturing processes that use 3D CAD (computer aided design/computer aided drafting) data as a digital information source. The process may then use energy in the form of a high-power laser beam that is controlled and directed based on the CAD data so as to create three-dimensional metal parts by fusing fine metal powders together.

A user may 3-D print a workpiece using a single material (e.g., a single type of thermoplastic) or with multiple materials. A workpiece may include two or more different materials, and these materials may be present in separate regions of the workpiece or may be mixed together in a single region. To accomplish this, the user supplies the 3-D printing device with the necessary materials for workpiece fabrication. As described above, a data file may be used to direct a 3-D printer to dispense different materials to different locations during workpiece printing or even dispense different materials at different stages of the printing process.

Thus, the present disclosure provides methods of fabricating the disclosed workpieces and other components. These methods may comprise forming the workpiece via additive manufacturing. As described elsewhere herein, a workpiece may have formed therein a plurality of resin channels that are configured to deliver resin to first and second steam channels. The first and second steam channels may be received by a stage 1 manifold. The manifold may also be formed within the workpiece during the additive manufacturing process. Additive manufacturing may thus be performed to give rise to a polymer precipitation system according to the present disclosure. (Method of additive manufacture are known in the art, and exemplary such methods are described elsewhere herein.)

Aspect 29. The system of any of aspects 1-28, wherein a resin channel has a cross-sectional dimension in the range of from about (or from) 0.254 mm to about (or to) 254 mm, e.g., from 12.7 mm to about 25.4 mm, or even from about (or from) 2.54 mm to about (or to) 12.7 mm.

Aspect 30. The system of any of aspects 1-29, wherein a steam channel has a cross-sectional dimension in the range of from about (or from) 2.54 mm to about (or to) 254 mm, e.g., from about (or from) 1.7 mm to about (or to) 127 mm, or even from about (or from) 25.4 mm to about (or to) 50.8 mm.

Aspect 31. The system of any of aspects 1-30, wherein a stage 1, stage 2, or stage 3 manifold has a cross-sectional dimension in the range of from about (or from) 25.4 mm to about (or to) 508 mm, e.g., from about (or from) 50.8 mm to about (or to) 254 mm, or even from about (or from) 127 mm to about (or to) 177.8 mm.

Aspect 32. The system of any of aspects 1-31, wherein two or more resin channels are in fluid communication with a common resin source.

Aspect 33. The system of any of aspects 1, 17, or 23, wherein the stage 1, stage 2, or stage 3 manifold is in fluid communication with a separation element configured to separate polymer from solvent.

Aspect 34. The system of any of aspects 1-33, wherein at least one of the first plurality of resin channels defines an opening to deliver resin to the interior of the first steam channel Aspect 35. The system of aspect 34, wherein the opening is circular, ovoid, polygonal, or any combination thereof.

Aspect 36. A process for drying resinous materials, comprising (or even consisting of or consisting essentially of): delivering, by way of a plurality of resin channels, resin fluid comprising (or even consisting of or consisting essentially of) polymer and solvent into at least first and second steam channels having within a flow of steam, the first and second steam channels each receiving resin fluid from a plurality of resin channels, the first and second steam channels each being received by a stage 1 manifold, the steam and resin being delivered under conditions so as to separate at least some of the solvent from the resin fluid; and collecting at least some of the polymer from the resin fluid. (The collected polymer may have a weight percent water content of, e.g., 1 to 60 wt %, e.g., 5 to 20 wt %.)

Aspect 37. The process of aspect 36, wherein the mass flow ratio of resin fluid to steam in at least one of the first and second steam channels is in the range of from about 1:10,000 to 10,000:1, e.g., 1:1000 to 1000:1, 1:100 to 100:1, or even 1:10 to 10:1. In some embodiments, the steam/resin ratio for a jet may be in the range of about 0.8 to 4.0. As an example, assuming 25% polymer, this converts to a solution/steam ratio of 4.4 to 1.0).

Aspect 38. The process of any of aspects 36-37, wherein the stage 1 manifold receives from 2 to about 50 (or 50) steam channels.

Aspect 39. The process of any of aspects 36-38, wherein at least one of the first and second steam channels receives resin fluid from 2 to about 50 (or 50) resin channels.

Aspect 40. The process of any of aspects 36-39, wherein at least some of the resin channels received by the first steam channel share a resin source with at least some of the resin channels received by the second steam channel.

Aspect 41. The process of any of aspects 36-40, wherein the steam mass flow rate in the first, second, or both steam channels is in the range of from about (or from) 0.45 kg/hour to about 4535 or even about 6804 kg/hour [0.1 to about (or to) 10,000 or even 15,000 pounds per hour, e.g., 10 to about (or to) 1000, or even about 5 (or 5) to about 500 (or to 500) pounds per hour.] The steam mass flow rate in the first, second, or both steam channels may be in the range of from about (or from) 0.5 kg/hour to about 6000 kg/hour, or from 1 kg/hour to about 5750 kg/hour, or from 5 kg/hour to 5000 kg/hour, or from 10 kg/hour to 4500 kg/hour, or from 20 kg/hour to 4000 kg/hour, or from 30 kg/hour to 3500 kg/hour, or from 40 kg/hour to 3000 kg/hour, or from 50 kg/hour to 2500 kg/hour, or from 50 kg/hour to 2000 kg/hour, or from 100 kg/hour to 1500 kg/hour, or from 150 kg/hour to 1000 kg/hour, or from 200 kg/hour to 500 kg/hour. The steam may be superheated, though this is not a requirement.

A flowing steam atmosphere may have a temperature of from 149 deg. C. (300 deg. F.). to 260 deg. C. (500 deg. F.). and a pressure of 689 to 1448 kPa (100-210 psig). The temperature of the steam must be sufficiently high to vaporize methylene chloride, but should also be sufficiently low to avoid fusion of particles caused by melting. Without being bound to any particular theory of operation, the pressure should be sufficiently high to supply a driving force for the devolatilization, but must be low enough to minimize condensation of the steam. The steam to resin weight ratio may be between 1 and 4, and more preferably from 1.2 to 2.5.

Aspect 42. The process of any of aspects 36-41, wherein the resin fluid flow rate in the first, second, or both steam channels is in the range of from about (or from) 0.045 kg/hour to about 4535 kg/hour [0.1 to about 10,000 (or to 10,000) pounds per hour], from about 1 (or 1) to about 1000 (or to 1000) pounds per hour, or even from 50 to 500 pounds per hour. For example, the resin flow may be from about 0.05 to about 4500 kg/hour, or from about 0.1 to about 4000 kg/hour, or from about 1 to about 3500 kg/hour, or from about 10 to about 3000 kg/hour, or from about 20 to about 2500 kg/hour, or from about 30 to about 2000 kg/hour, or from about 40 to about 1500 kg/hour, from about 50 to about 1000 kg/hour, or even from about 100 to about 500 kg/hour.

Aspect 43. The process of any of aspects 36-41, wherein the steam velocity in the first, second, or both steam channels is in the range of from about 0.1 (or 0.1) to about 1000 (or to 1000) m/s, or from about 1 (or 1) to about 500 m/s (or to 500 m/s).

Aspect 44. The process of any of aspects 36-43, wherein the resin fluid velocity in the first, second, or both steam channels is in the range of from about 1 to about 200 m/s.

Aspect 45. The process of any of aspects 36-44, wherein the mass flow ratio of the solvent present in the collected polymer to the solvent in the resin fluid is 1:1 or less, about 1:10 (or 1:10) or less, about 1:100 (or 1:100) or less, about 1:1000 (or 1:1000) or less, or even 1:10,000 or less.

The disclosed technology effects rapid solvent vaporization in the case of methylene chloride. As one example, within the jet, the percentage of methylene chloride in the polymer solution-particle can drop from 25% to as low as 2% in a distance of 15.2 cm (6 inches).

Aspect 46. The process of any of aspects 36-45, wherein the collected polymer is in the form of particulate.

Aspect 47. The process of aspect 46, wherein the collected polymer has an average cross-sectional dimension (e.g., one or more of height, width, and/or diameter) in the range of from about 400 microns to about 1500 microns. The weight percentage greater than 20% mesh for collected polymer may be in the range of from about 40% (or 40%) to about 70% (or to 70%). The collected polymer may, in some embodiments, be porous, which in turn allows for rapid removal of residual solvent.

Aspect 48. The process of any of aspects 36-47, further comprising (or even consisting of or consisting essentially of) heating collected polymer so as to remove solvent from the collected polymer.

Aspect 49. The process of any of aspects 36-48, wherein the flow at any of a stage 1, stage 2, or stage 3 manifold is a choked flow. As is known in the art, choked flow refers to a flow effect in which the fluid velocity becomes limited or "choked." Without being bound to any particular theory, choked flow is thus a limiting condition where the velocity/mass flow will not increase with a further decrease in the downstream pressure environment while upstream pressure is fixed. Put another way, choked flow limits the mass flow rate of a compressible fluid flowing through nozzles, orifices and sudden expansions. Without being bound to any particular theory, choked flow is a mass flux after which a further reduction in downstream pressure will not result in an increase in mass flow rate.

Aspect 50. The process of any of aspects 36-49, wherein at least one resin channel delivers the resin to the steam channel at an angle of between about 1 degrees (or 1 degree) and about (or and) 179 degrees with relation to the direction of flow of the steam in the channel.

Aspect 51. The process of aspect 50, wherein at least one resin channel delivers the resin to the steam channel at an angle of between about 30 degrees (or 30 degrees) and 120 degrees with relation to the direction of flow of the steam in the channel.

The resin solution may comprise (or even consist of or consist essentially of) about 20 to 30 weight percent (or 20 to 30 weight percent) polycarbonate, but may contain more or less, e.g., from 10 to about 40, 50, 60, 70, or even about 80 wt % polycarbonate (or to 40, 50, 60, 70, or 80 wt % polycarbonate).

The disclosed technology provides a number of advantages over existing alternatives. Some of these advantages include increased energy efficiency (i.e., a reduction in the amount of energy needed to produce a unit of polymer particles) and reduced solvent usage.

Aspect 52. A polymer precipitation system, comprising (or even consisting of or consisting essentially of): a plurality of steam channels configured to receive resin fluid from a plurality of resin channels, the ratio of the number of resin channels to the number of steam channels being in the range of from greater than 1:1 to about 50:1 (or to 50:1); a plurality of stage 1 manifolds configured to receive the plurality of steam channels, at least one stage 1 manifold receiving two or more steam channels, the ratio of the number of steam channels to the number of stage 1 manifolds being in the range of from greater than 1:1 to about 50:1 (or to 50:1).

Aspect 53. The system of aspect 52, further comprising (or even consisting of or consisting essentially of) a plurality of stage 2 manifolds configured to receive stage 1 manifolds, the ratio of the number of stage 1 manifolds to the number of stage 2 manifolds being in the range of from 1:1 to about 50:1 (or to 50:1).

Aspect 54. The system of any of aspects 52-53, further comprising (or even consisting of or consisting essentially of) a plurality of stage 3 manifolds configured to receive stage 2 manifolds, the ratio of the number of stage 2 manifolds to the number of stage 3 manifolds being in the range of from 1:1 to about 50:1 (or to 50:1).

Aspect 55. The system of any of aspects 52-54, wherein at least two of (a) resin channel, (b) a steam channel, and (c) a stage 1, a stage 2, and a stage 3 manifold are formed in a workpiece.

Aspect 56. The system of aspect 55, wherein the workpiece is at least partially fabricated by additive manufacturing.

Aspect 57. The system of any of aspects 52-56, wherein the at least one stage 1, stage 2, or stage 3 manifold is sized so as to give rise to choke flow during system operation.

It should also be understood that a user may preheat the resin before steam drying. As one example, by preheating the resin, the weight percent total volatiles can be reduced by 19 to 27%. This reduction in volatiles is accomplished with perhaps a slight increase in particle size, but further experiments showed there is little effect on dryability. Specifically, if one applies heat to the particles and simultaneously graphs ln(wc/w) versus time in seconds, wherein wc is the weight fraction of moisture in the particle at the critical moisture level and w is weight fraction of moisture at drying time t, there is little change in slope from drying wet particles formed with and without preheating. The slope is determined in the transition drying regime, wherein the drying rate has moved from a constant drying rate to a continuously falling drying rate dominated by mixed drying mechanisms such as diffusion, surface tension, etc. For purposes of this application, the slope in this region is defined as "Dryability." The data indicates that preheating causes no adverse effects which make drying more difficult (e.g., morphology changes), and therefore the gain in obtaining a wet powder with lower percent volatiles is not offset by other effects. Also, no significant difference in bulk density of the final powder was observed upon comparing the preheating method described herein with an otherwise similar conventional steam isolation method.

Typically, the temperature of the solution is above 130° F. and below 600° F. It is desirable to make the temperature as high as possible while avoiding decomposition because in general, the higher the temperature, the less volatiles will be contained in the wet powder after steam precipitation. In a preferred embodiment of the invention, the temperature of the solution is greater than 77 deg. C. [170° F.], in a more preferred embodiment above 93 deg. C. [200° F.], and in a most preferred embodiment above 166 deg. C. [330° F.]

Aspect 58. The system of aspect 1, wherein at least two of (a) resin channel, (b) a steam channel, and (c) a stage 1 manifold are formed in a workpiece.

Aspect 59. The system of aspect 17, wherein at least two of (a) resin channel, (b) a steam channel, and (c) a stage 1 or stage 2 manifold are formed in a workpiece.

What is claimed:

1. A system, comprising:
an inlet that diverges into a plurality of branches including a first branch and a second branch;
a first plurality of resin channels configured for fluid communication with the first branch;
a first steam channel in fluid communication with the first plurality of resin channels, and the first plurality of resin channels being configured to deliver resin to an interior of the first steam channel;
a second plurality of resin channels configured for fluid communication with the second branch;
a second steam channel in fluid communication with the second plurality of resin channels, and
the second plurality of resin channels being configured to deliver resin to an interior of the second steam channel; and
the first and second steam channels converging at a first stage 1 manifold;
wherein the system is configured to establish a choke flow of a fluid passing through the first stage 1 manifold of the system; and
wherein at least one of
the first stage 1 manifold has a cross-sectional area within about 20% of total cross-sectional areas of the first and second steam channels in fluid communication with the first stage 1 manifold;
further comprising a third steam channel and a fourth steam channel; or
the system comprising from 2 to about 30 stage 1 manifolds.

2. The system of claim 1, wherein the first stage 1 manifold has the cross-sectional area within about 20% of the total cross-sectional areas of the first and second steam channels in fluid communication with the first stage 1 manifold.

3. The system of claim 1, wherein at least one of the first and second pluralities of resin channels comprises from 2 to about 50 channels.

4. The system of claim 1, further comprising the third steam channel and the fourth steam channel.

5. The system of claim 4, wherein the third and fourth steam channels are in fluid communication, respectively, with third and fourth pluralities of resin channels.

6. The system of claim 4, wherein the first stage 1 manifold is configured to receive one or both of the third and fourth steam channels.

7. The system of claim 4, further comprising a second stage 1 manifold, the second stage 1 manifold being configured to receive one or both of the third and fourth steam channels.

8. The system of claim 4, further comprising a second stage 1 manifold, the second stage 1 manifold being configured to receive one or both of the third and fourth steam channels, and further comprising a first stage 2 manifold configured to receive one or both of the first stage 1 manifold and the second stage 1 manifold.

9. The system of claim 8, wherein a cross-sectional area of the first stage 2 manifold is less than the total cross-sectional area of the first and second stage 1 manifolds that the first stage 2 manifold receives.

10. The system of claim 1, wherein the system comprises from 2 to about 30 stage 1 manifolds.

11. The system of claim 10, wherein at least 2 of the stage 1 manifolds receive from 2 to about 50 resin channels.

12. The system of claim 10, further comprising from 2 to about 30 stage 2 manifolds.

13. The system of claim 12, wherein at least 2 stage 2 manifolds receive 2 or more stage 1 manifolds.

14. The system of claim 12, further comprising at least one stage 3 manifold.

15. The system of claim 14, wherein the at least one stage 3 manifold receives at least one stage 2 manifold.

16. The system of claim 1, comprising the third steam channel and the fourth steam channel; and further comprising: a second stage 1 manifold, the second stage 1 manifold being configured to receive one or both of the third and fourth steam channels, a stage 2 manifold configured to receive one or both of the first stage 1 manifold and the second stage 1 manifold; and optionally a stage 3 manifold configured to receive the stage 2 manifold; wherein a cross-sectional area of the stage 2 manifold is less than a total cross-sectional area of the first and second stage 1 manifolds that the stage 2 manifold receives; and/or the stage 3 manifold is present and a cross-sectional area of the stage 3 manifold is less than the total cross-sectional area of the stage 2 manifold that the stage 3 manifold receives.

17. A method, comprising:
forming, by additive manufacturing a workpiece that comprises
an inlet that diverges into a plurality of branches including a first branch and a second branch;
a first plurality of resin channels configured for fluid communication with the first branch;
a first steam channel in fluid communication with the first plurality of resin channels, and the first plurality of resin channels being configured to deliver resin to an interior of the first steam channel;
a second plurality of resin channels configured for fluid communication with the second branch;
a second steam channel in fluid communication with the second plurality of resin channels, and
the second plurality of resin channels being configured to deliver resin to an interior of the second steam channel; and
the first and second steam channels converging at a first stage 1 manifold;
wherein the system is configured to establish a choke flow of a fluid passing through the first stage 1 manifold of the system; and
wherein at least one of
the first stage 1 manifold has a cross-sectional area within about 20% of total cross-sectional areas of the first and second steam channels in fluid communication with the first stage 1 manifold;
further comprising a third steam channel and a fourth steam channel; or the system comprising from 2 to about 30 stage 1 manifolds.

* * * * *